Patented Dec. 1, 1942

2,303,769

UNITED STATES PATENT OFFICE 2,303,769

POLYMERIZATION OF OLEFINS

Donald R. Stevens, Swissvale, and William A. Gruse, Wilkinsburg, Pa., assignors to Gulf Research & Development Company, Pittsburgh, Pa., a corporation of Delaware No Drawing. Application October 27, 1936, Serial No. 107,905

3 Claims. (Cl. 196—10)

This invention relates to polymerization of olefins, and it comprises a method of treating olefinic gases for the production of low-boiling liquid polymers useful as motor fuel, which comprises bringing the olefinic gases into contact with a partially neutralized strong acid, that is to say a mixture of a strong acid such as strong sulfuric acid, benzene sulfonic acid or the like, and a salt of that acid with an alkali-forming metal or radical such as sodium, potassium or ammonium; all as more fully hereinafter set forth and claimed.

Considerable attention has been paid in recent years to the polymerization of olefinic gases for the production of low-boiling liquid polymers useful as motor fuel. Various thermal and catalytic processes have been proposed and used. Of the catalytic processes, one which has attained some success relies upon the use of phosphoric acid as a polymerizing catalyst. Commercial sirupy phosphoric acid (ortho phosphoric acid) can be used to give a fair yield of polymers from olefinic gases, when properly employed, and the products obtained are largely useful as motor fuel. However, the process is subject to some disadvantages; phosphoric acid is relatively expensive and at high temperatures the ortho acid tends to go over to dehydrated forms (pyro and meta acids) in an irregular way with irregular results. Sometimes volatile esters are produced.

Sulfuric acid is free from the disadvantages noted and is much cheaper than phosphoric acid, but it is a stronger acid and this fact imposes some restriction upon its use. If high-strength acid is used, it tends at elevated temperatures to react with the hydrocarbons undergoing treatment, forming sulfur dioxide and carbonization products. Strong sulfuric acid also tends to have too severe a polymerizing effect, producing polymers which are too high boiling to be used for gasoline motor fuel. On the other hand, dilute sulfuric acid is largely restricted in its polymerization effect to iso-butylene. Thus, iso-butylene may be polymerized to di-iso-butylene and tri-iso-butylene by absorption of iso-butylene in 60 to 65 per cent $H_2SO_4$, the acid being subsequently adjusted in acidity and warmed to separate polymerized products, as disclosed in our copending application Serial No. 54,336, filed December 13, 1935, said method comprising a modification of the well known Butlerow method described in the literature as far back as 1877.

Our present invention comprises a process of polymerizing gaseous olefins in which the disadvantages of the processes mentioned hereinabove are overcome. According to our invention, the polymerizing agent comprises a partially neutralized strong acid such as strong sulfuric acid, benzene sulfonic acid, toluene sulfonic acid or the like; the partially neutralized acid having a modified or mitigated effect as compared with the use of the strong acid itself, whereby the tendency toward undesirable side reactions is reduced and the extent of polymerization is controlled to give more volatile polymers than would otherwise be the case.

The partial neutralization of the strong acid may be carried out by simply adding an alkali such as caustic soda or caustic potash, or by adding ammonia either as such or in the form of ammonium hydroxide to the strong acid, or by simply adding to the strong acid that salt which would result as a product of such partial neutralization. Thus, in the case of sulfuric acid we may add sodium sulfate or sodium acid sulfate, the latter being preferred; in the case of benzene sulfonic acid we may add sodium or potassium benzene sulfonate, and so on. In either event, the neutralization or equivalent addition of neutralization products is so carried out as to give a final product containing 10 per cent or more of the normal product of neutralization, based on the amount of acid used, up to the point of saturation.

Where a high yield of gasoline polymers is desired, the process is carried out by subjecting olefinic gases containing butylenes or propylene or both to contact with the partially neutralized strong acid at a suitable elevated temperature, preferably one sufficiently high to permit volatilization and removal of polymers as they are formed, the polymers being subsequently condensed.

On the other hand, when a high yield of polymers heavier than gasoline is desired, as in the manufacture of a safety fuel of low volatility, lower temperatures, for example 100° C, or less, are employed; in this case the liquid polymers may not entirely volatilize and are separated from the catalyst in liquid form.

In continuous operation it is advantageous to distribute or support the partially neutralized strong acid upon a suitable inert carrier such as pumice, a ceramic material or the like, for contact purposes.

The strength of the initial acid, before neutralization or addition of salt thereto, may vary considerably with the temperature employed and the results desired. Ordinarily we prefer to use 80 to 90 per cent sulfuric acid. However, somewhat more dilute acid, for example down to 65 per cent sulfuric acid, may be employed at high temperatures if desired, although a diminution in the extent of polymerization results, especially with regard to relatively dilute olefinic gases. On the other hand, 90 to 100 per cent sulfuric acid may be employed, especially with relatively dilute olefinic gases, but the polymers formed tend to be somewhat less volatile; the use of 90 to 100 per cent sulfuric acid, partially neutralized as aforesaid, is however useful for the manufacture of safety fuel and some products of relatively low volatility.

The temperatures employed will depend largely upon the strength of the acid and the concentration of the olefinic starting material, but in general should be sufficient to permit vaporization and removal of the polymers, or a desired fraction thereof. With the preferred partially neutralized 80 to 90 per cent sulfuric acid, temperatures may run as high as 200° C. even higher, while with the sulfonic acids temperatures not exceeding 150° C. are desirable. At the higher temperatures the polymers formed tend to be more volatile than at the lower temperatures, other factors being the same.

The pressures employed in the operation may run as high as 500 pounds per square inch, the higher pressures being especially useful when relatively dilute olefinic gases are employed as starting material, but ordinarily the preferred pressure range is from 100 to 300 pounds per square inch.

The following examples will illustrate the practice and advantages of our invention:

In one example a butane cut obtained from refinery cracked gas was treated with 90 per cent sulfuric acid. In a second example a similar cut was treated with 90 per cent sulfuric acid to which had been added 10 per cent by weight of sodium acid sulfate; while in a third example a similiar cut was treated with 90 per cent sulfuric acid saturated with sodium acid sulfate. A tabulation of the results obtained follows:

|  | Example 1 | Example 2 | Example 3 |
|---|---|---|---|
| Concentration of initial sulfuric acid, per cent | 90 | 90 | 90 |
| Per cent by weight of NaHSO₄ | 0 | 10 | sat. |
| Temperature: °F | 70 | 70 | 70 |
| Time of contact: minutes | 5 | 5 | 5 |
| Temperature rise | (¹) | (²) | (²) |
| Polymer yield (per cent by weight of unsats.) | 71.3 | 77.2 | 78.5 |
| Color of used acid | (³) | (⁴) | (⁴) |
| Distillation characteristics of polymers: |  |  |  |
| Up to 284° F; per cent | 9.5 | 13.0 | 12.0 |
| 284° to 375° F; per cent | 28.5 | 27.0 | 31.0 |
| Above 375° F; per cent | 62.0 | 60.0 | 57.0 |

¹ Definite.  ² Slight.  ³ Dark.  ⁴ Light.

The above examples were batch operations carried out in a closed system under only such pressure as developed therein. It will be noted that the use of sodium acid sulfate increased the yield of polymers and reduced the tendency toward side reactions and decomposition, as is evidenced by the lighter color of the used acid and the lower rise in temperature as compared with the use of the strong acid alone.

In two additional examples, iso-butylene was contacted with benzene sulfonic acid in one instance and with a mixture of 75 parts by weight sulfonic acid and 25 parts by weight of sodium benzene sulfonate in the other instance, the catalyst in each case being supported on pumice, and iso-butylene being passed continuously therethrough at temperatures between 100° and 120° C. A tabulation of the results follows:

|  | Example 4 | Example 5 |
|---|---|---|
| Catalyst: |  |  |
| Benzene sulfonic acid: Per cent by weight | 100 | 75 |
| Sodium benzene sulfonate: per cent by weight | 0 | 25 |
| Yield of polymers: per cent by weight | 98.1 | 80.8 |
| Distillation characteristics of polymers: |  |  |
| Up to 140° C.: per cent by weight | 17.8 | 52.1 |
| 140° to 200° C.: per cent by weight | 66.8 | 44.2 |
| Above 200° C.: by weight | 14.4 | 3.7 |
| SO₂ liberation | (¹) | (²) |

¹ Marked.
² Mild.

While the total yield of polymers in Example 5 is lower than in Example 4, this may readily be increased by recycling or by series contact in a plurality of stages. The principal effects noted in Example 5 are the higher volatility range of the polymers obtained and the substantial absence of side reactions as indicated by the lessened evolution of SO₂. It will be clear that when suitable steps are taken as aforesaid to increase the total yield of polymers, there will be larger yield of polymers within the gasoline boiling point range than is true in the case of the strong acid alone, as in Example 4.

In another set of examples, a butane cut was passed over pumice wetted with 90 per cent sulfuric acid which had been saturated with sodium acid sulfate. A tabulation of the results follows:

|  | Example 6 | Example 7 |
|---|---|---|
| Temperature: °F | 70 | 212 |
| Pressure: lbs. per sq. in | 100 | 300 |
| Yield polymers: per cent of total unsats | 48.7 | 51.5 |
| Distillation characteristics of polymers: |  |  |
| Up to 284° F.: per cent | 62.3 | 74.0 |
| 284° to 375° F.: per cent | 27.2 | 23.9 |
| Above 375° F.: per cent | 10.5 | 2.1 |

At higher temperatures and pressures larger yields of polymers are obtained.

In Examples 1, 2, 3, 6 and 7 the butane cut employed was a refinery gas fraction containing 32 per cent iso-butylene, 32 per cent 1-butene and 2-butene, 5.7 per cent C₃ hydrocarbons, and the balance consisting of normal and iso-butane. Our experience has shown that our process effects polymerization not only of iso-butylene but also of 1-butene and 2-butene as well as propylene. Ethylene is less readily polymerized.

Wherever the gases to be employed contain sulfur in such form or in such amount as to give a polymer difficult to refine in any of the ordinary manners, it is advisable to subject the gases to a desulfurizing treatment prior to contacting them with the catalyst. Various desulfurizing methods are available, and do not require description here. Ordinarily, the polymers need only simple alkali and water washes for refining purposes.

It may be observed that at high temperatures and when the gases are dry, the acid mixture may tend to lose moisture and become more concentrated. In continuous operation this effect is readily overcome by adding sufficient moisture either to the acid or to the gases, to balance the dehydrating effect and maintain the acid at the desired concentration.

In the polymerization process described, the resultant polymers are of exceptional value as motor fuel both by reason of their volatility and by reason of their high anti-knock value. The absence of undesirable side reactions which would otherwise result from the use of the strong acid alone is marked, it being one of the advantages of our present invention that the acid-catalyst mixture is not rapidly deteriorated and is capable of being employed for extended periods; strong acid alone tends to darken considerably in use and is thereby rendered unfit for further use.

While our invention has been described hereinabove with reference to the polymerization of a particular butane cut and of iso-butylene in concentrated form, it will be obvious that other refinery gases and other olefinic gases in general may be employed as starting materials in so far as they contain substantial quantities of polymerizable olefinic constituents, especially butylenes and propylene.

It will, moreover, be apparent to those skilled in the art that whereas our invention has been described hereinabove with reference to various specific operating details, by way of example, our invention is not in its broadest aspects limited to such operating details, but may be variously practiced within the scope of the claims hereinafter made.

What we claim is:

1. In a process of producing liquid polymers useful as motor fuels by polymerizing gaseous olefins the improvement which comprises subjecting mono-olefin gas to contact with a mixture of benzene sulfonic acid and sodium benzene sulfonate.

2. A process as claimed in claim 1 wherein contact with the acid mixture is effected at an elevated temperature not above 150° C.

3. In a process of producing gasoline-like normally liquid hydrocarbons useful as motor fuel from normally gaseous mono-olefins, the improvement which comprises subjecting such an olefin to contact with a mixture of a sulfonic acid and an alkali salt thereof.

DONALD R. STEVENS.
WILLIAM A. GRUSE.